United States Patent
Roszman et al.

(10) Patent No.: US 7,051,848 B2
(45) Date of Patent: May 30, 2006

(54) TEMPERATURE SPECIFIC MECHANISM RETAINING BRAKE PADS IN A CALIPER ASSEMBLY DURING SHIPPING

(75) Inventors: Eric John Roszman, Farmington Hills, MI (US); Orit Dana Baron, West Bloomfield, MI (US)

(73) Assignee: Akebono Corporation (North America), Farmington Hills, MI (US)

( * ) Notice: Subject to any disclaimer, the term of this patent is extended or adjusted under 35 U.S.C. 154(b) by 0 days.

(21) Appl. No.: 10/910,619

(22) Filed: Aug. 3, 2004

(65) Prior Publication Data

US 2006/0027426 A1 Feb. 9, 2006

(51) Int. Cl.
*F16D 69/00* (2006.01)

(52) U.S. Cl. ............... 188/251 A; 188/218; 188/250 B (58) Field of Classification Search ............... 188/71.1, 188/251 A, 18 A, 218, 73.32; 156/247, 344
See application file for complete search history.

(56) References Cited

U.S. PATENT DOCUMENTS

| | | | | |
|---|---|---|---|---|
| 3,367,233 A | * | 2/1968 | Silverschotz | ............... 89/1.51 |
| 3,552,527 A | * | 1/1971 | Hayes | ............... 188/73.45 |
| 3,918,555 A | | 11/1975 | Rath | |
| 4,976,800 A | * | 12/1990 | Edwards | ............... 156/151 |
| 4,995,484 A | | 2/1991 | Kadel | |
| 5,100,494 A | * | 3/1992 | Schmidt | ............... 156/344 |
| 5,117,949 A | | 6/1992 | Buckley et al. | |
| 5,325,008 A | | 6/1994 | Grant | |
| 5,518,088 A | * | 5/1996 | Brosilow | ............... 188/73.37 |
| 5,964,140 A | | 10/1999 | Guenther et al. | |
| 6,135,244 A | * | 10/2000 | Le Bris | ............... 188/73.37 |
| 6,357,559 B1 | * | 3/2002 | Madzgalla et al. | ............... 188/73.32 |
| 6,464,045 B1 | | 10/2002 | Weber et al. | |
| 6,594,890 B1 | | 7/2003 | Arai et al. | |
| 6,773,535 B1 | * | 8/2004 | Wetzel | ............... 156/247 |

FOREIGN PATENT DOCUMENTS

| | | |
|---|---|---|
| DE | 85 12 757 | 8/1986 |
| DE | 196 10 612 | 9/1997 |
| DE | 101 03 485 | 8/2002 |
| EP | 0 859 162 | 9/1998 |
| EP | 1 035 345 | 9/2000 |

OTHER PUBLICATIONS

3M Scotch-Weld Epoxy Adhesive: 2216 B/A Gray-2216 B/A Tan NS-2216 B/A Translucent, Technical Data, Mar. 2002, pp. 1-8.

* cited by examiner

*Primary Examiner*—James McClellan
*Assistant Examiner*—Mariano Sy
(74) *Attorney, Agent, or Firm*—Harness, Dickey & Pierce, P.L.C.

(57) ABSTRACT

A brake system includes a caliper and a brake element. The brake system further includes an adhesive that adheres the brake element to the caliper. The adhesive stops adhering the brake element to the caliper after the adhesive heats to an elevated temperature. The adhesive retains the brake element in the caliper during shipping and component handling but stops adhering the brake element after a first service use of the vehicle.

31 Claims, 7 Drawing Sheets

TEMPERATURE SPECIFIC MECHANISM RETAINING BRAKE PADS IN A CALIPER ASSEMBLY DURING SHIPPING

FIELD OF THE INVENTION

The present invention relates to temporary retention of brake pads within a caliper, and more particularly relates to a temperature sensitive adhesive that adheres the brake pads in the caliper until the caliper heats to a service temperature.

BACKGROUND OF THE INVENTION

In a traditional disc brake system, a pair of brake pads with friction members attached thereto is slidably mounted within a caliper assembly. The brake pads forcibly press against a rotor to effect braking and slow a vehicle. The brake system is typically shipped with the brake elements installed in the caliper assembly. A disc brake system customer simply installs the disc brake system onto the vehicle. Because the rotor is absent during shipping, the brake pads are able to move within the caliper assembly to a greater degree than if the rotor were present. The brake pads, otherwise not restrained by the presence of the rotor, may fall into the rotor gap during shipping of the brake system or may completely fall from the brake system during installation. If the brake pads fall out of place, re-installation becomes necessary.

It will be appreciated that in a large volume assembly process, brake pads could be installed improperly, such that the friction members, for example, do not properly face the rotor. It will also be appreciated that brake pads are commonly referred to as brake elements or disc brakes and may be referred to as such. It will additionally be appreciated that the area in which the rotor would have occupied is known as a rotor gap or a rotor clearance gap.

A plastic "T", a sponge spacer or other suitable spacers of various materials and shapes may be placed in the caliper to prevent the brake pads from falling into the rotor gap. The brake pads can nevertheless fall into the rotor gap when the spacer is removed as the caliper assembly is installed. The spacer is an additional component of the brake system that adds cost and complexity. Re-installation of the brake pads may also increase assembly costs and complexity. Moreover, re-installation of the brake pads, once they have moved from a proper position, may result in an improper re-installation of the brake pads.

SUMMARY OF THE INVENTION

In the various embodiments of the present invention, a brake system includes a caliper and a brake element. The brake system further includes an adhesive that adheres the brake element to the caliper. The adhesive stops adhering the brake element to the caliper after the adhesive heats to an elevated temperature.

Further areas of applicability of the present invention will become apparent from the detailed description provided hereinafter. It should be understood that the detailed description and specific examples, while indicating the various embodiments of the present invention, are intended for purposes of illustration only and are not intended to limit the scope of the present invention.

BRIEF DESCRIPTION OF THE DRAWINGS

The present invention will become more fully understood from the detailed description, the appended claims, and the accompanying drawings, wherein:

DETAILED DESCRIPTION OF THE PREFERRED EMBODIMENTS

The following description of the various embodiments is merely exemplary in nature and is in no way intended to limit the present invention, its application, or uses.

Figure 1:
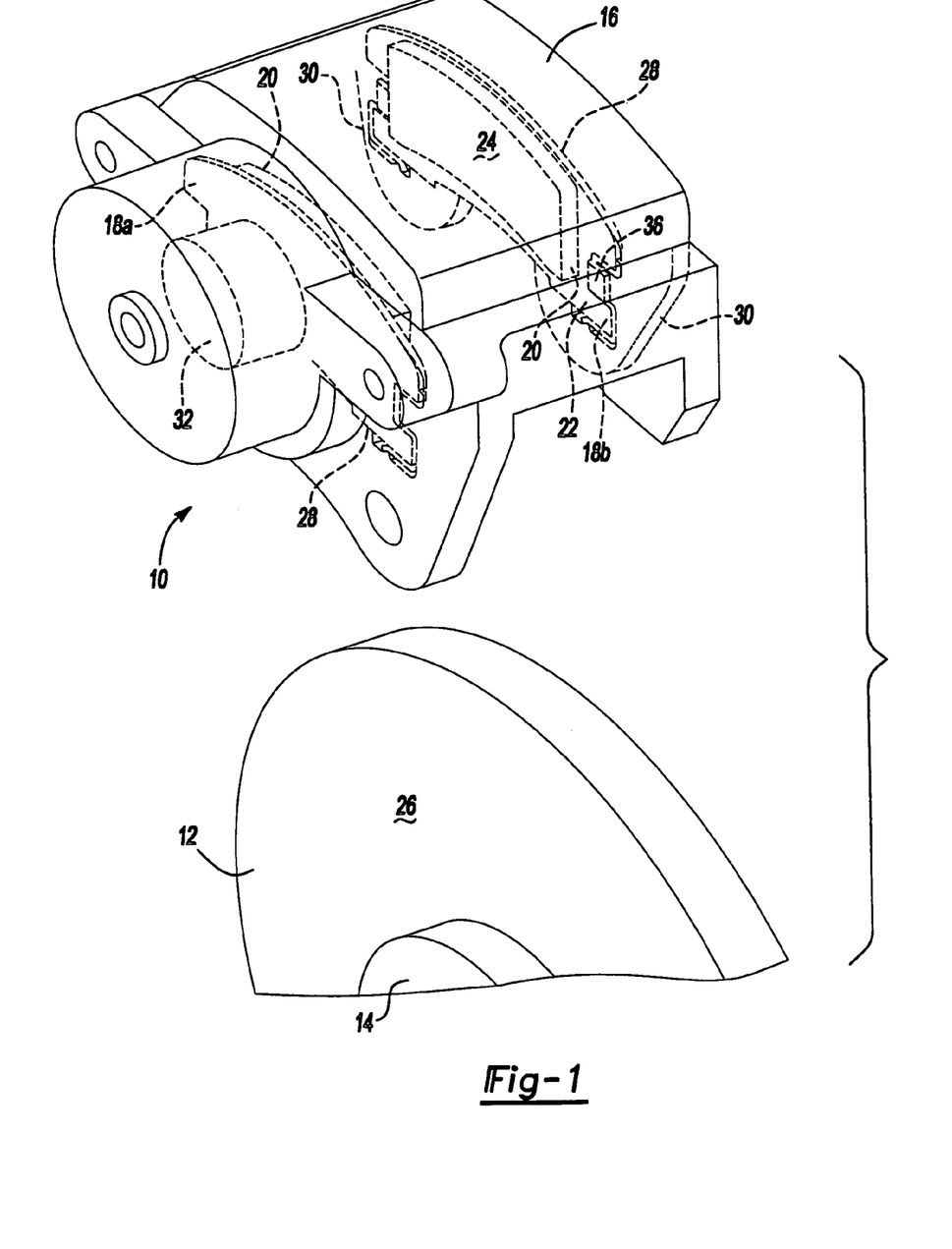
FIG. 1 is a partial perspective view of a brake assembly.

In FIG. 1, a brake system is generally indicated by reference numeral 10. The brake system 10 includes a rotor 12 having a hub 14 that is positioned into a caliper 16. The brake system 10 also includes an inboard brake element 18a an outboard brake element 18b, respectively referred to hereinafter as brake elements 18 or may be referred to as the brake pads 18 or the disc brakes 18. It will be appreciated that the brake system 10 is shown in a simplified fashion and, as such, a more detailed explanation of an exemplary brake system is disclosed in commonly assigned U.S. Pat. No. 4,351,421, titled Disc Brake filed Jul. 18, 1980, which is hereby incorporated by reference in its entirety.

Each of the brake elements 18 includes a friction member 20 that is connected to a structural backing 22. It will be appreciated that the friction member 20 is a portion of the brake element 18 that makes contact with the rotor 12 in the brake system 10, which ultimately slows the motion of the vehicle (not shown). When the friction member 20 contacts the rotor 12, the friction member 20 heats and wears, in the form of gas and debris, and as such is considered the expendable portion of the brake system 10. The heat generated by this use is transferred throughout the brake system 10.

The friction member 20 of the present invention can be configured in various shapes and thickness and mounted in various ways on the structural backing 22. One such exemplary configuration of the friction member 20 is disclosed in commonly assigned United States Patent Application titled Friction Materials Configuration and Method of Manufacture for Brake application Ser. No. 10/696,934, filed Oct. 30, 2003, which is hereby incorporated by reference in its entirety.

Moreover, the friction member 20 can have multiple formulations, one or more of which can be mounted to the structural backing 22. One such exemplary formulation is disclosed in commonly assigned United States Patent Application titled Brake Friction Material Including Titanium Dioxide Particles, Ser. No. 10/345,713, filed Jan. 16, 2003, which is hereby incorporated by reference in its entirety. Furthermore, the friction member 20 can be mounted to the structural backing 22 with many different methods. One such mounting method is disclosed in commonly assigned U.S. Pat. No. 5,073,099, titled Hot Press for Heat Forming a Disc Pad, issued Dec. 17, 1991, which is hereby incorporated by reference in its entirety.

The structural backing 22 can be typically made of one or more various steel formulations known to one skilled in the art that are suitable for vehicular brake applications. It will be appreciated that many materials may be suitable, which can otherwise withstand the stress and the duty cycle of a vehicular braking environment and an environmental regime in which the brake system 10 is located.

The friction member 20 has a contact face 24 that makes contact with a rotor face 26 of the rotor 12. The structural backing 22 has an overall shape that is configured to complement and be positioned within an interior portion 28 of the caliper 16. It will be appreciated that the caliper 16 includes one or more pistons 32 having a piston face 34 that clamps the brake elements 18 against the rotor 12. In addition, the caliper 16 includes a plurality of fingers 30 formed from the interior portion 28 of the caliper 16 and located on the opposite side of the caliper 16 from the piston 32. It follows that the brake elements 18 must move within the caliper 16 from a rest position to a clamping position. As such, one or more mounting clips 36 can be introduced and disposed between the structural backing 22 and the caliper 16 to among other things reduce sliding friction therebetween.

It will be appreciated that other components or designs may be included in the brake system 10 to address the motion of the respective brake elements 18. As such, exemplary brake systems using pins or rails to guide or further facilitate the motion of the brake pads 18 are shown in commonly assigned U.S. Pat. No. 6,286,636, issued Sep. 11, 2001, titled Disc Brake and in copending U.S. patent application Ser. No. 10/395,925 filed Mar. 24, 2003, titled One Piece Sliding Brake Caliper, both of which are incorporated by reference in their entirety.

Figure 2:
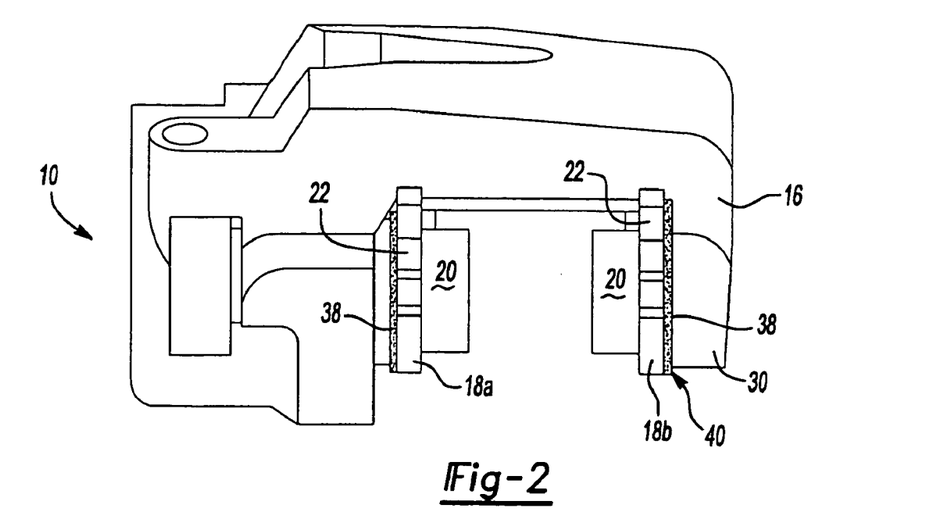
FIG. 2 is a partial side view of a brake caliper constructed in accordance with various embodiments of the present invention showing brake elements attached to a brake caliper with an adhesive member.

With reference to FIG. 2, the caliper 16 is shown having the brake elements 18 mounted thereto. An adhesive 38 is used to adhere each of the brake elements 18 to the caliper 16. The adhesive 38 provides temporary adhesion of the brake elements 18 to the caliper 16. During use of the brake system 10, however, heat generated by typical service use heats the brake system 10 to a service temperature, which is inherently higher than an ambient temperature. The increased temperature of the brake system 10, due to the aforementioned service use, heats the adhesive 38 to an elevated temperature. At the elevated temperature, the adhesive 38 ceases to adhere the brake elements 18 to the caliper 16.

A first service use of the brake system 10 is defined as the first time the brake elements 18 make contact with the rotor face 26 (FIG. 1) and the brake system 10 heats up to the typical service temperature. The typical service temperature of the brake system 10 is in a range from about 140 degrees Fahrenheit (about 60 degrees Celsius) to about 220 degrees Fahrenheit (about 105 degrees Celsius), but it should be appreciated that service temperatures are vehicle specific, brake system specific and affected by ambient conditions. To that end, service temperatures can be in excess of 1800 degrees Fahrenheit (1000 degrees Celsius) in certain regions of the brake system during excessive use. It will further be appreciated that the service temperature is not reached during the shipping process of the brake system 10, as ambient condition can range from about −40 degrees Fahrenheit (−40 degrees Celsius) to about 130 degrees Fahrenheit (about 54 degrees Celsius). Furthermore, about as used throughout can be defined as plus or minus 10 degrees Fahrenheit where applicable.

During the shipping process, the brake elements 18 may fall from the caliper 16 because, among other things, the rotor 12 is not present. Once the caliper 16 is installed in the vehicle and thus installed over the rotor 12, retention of the brake elements 18 within the caliper 16 is no longer needed. It will be appreciated that prior to the first service use of the brake system 10, some light or nominal use can occur. Light or nominal use can include driving the vehicle (not shown) onto a car carrier, onto a transport vessel, or around a manufacturing campus prior to shipment. Once the car is driven during normal service use such as driven home from the dealership, regular braking will cause the brake elements 18 to heat up beyond the typical service temperature, thus defining a first service use of the brake system 10. As such, the adhesive 38 ceases adhering the brake elements 18 to the caliper 16. It will also be appreciated that in some instances that use of the piston 32 may also push the brake element 18 away from the interior portion 28 of the caliper 16, which effectively breaks the bond between the brake element 18 and the caliper 16. This scenario is of no concern because the brake system 10 is already installed.

Figure 3A:
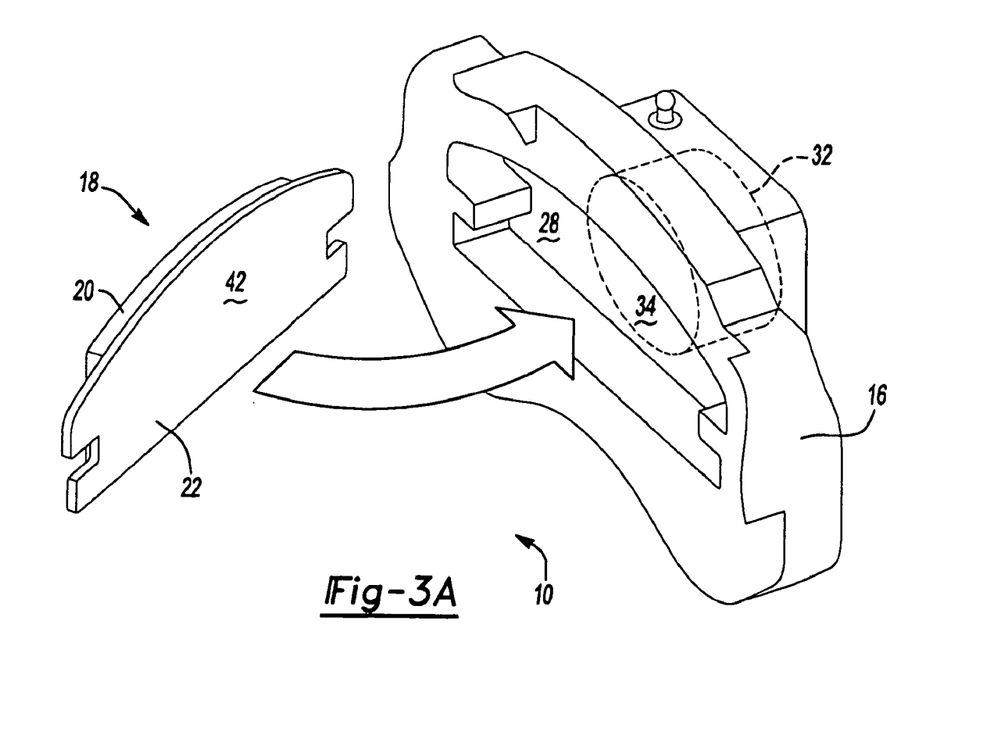
FIG. 3A is a partial perspective view of a brake caliper constructed in accordance with the various embodiments of the present invention showing one of the brake elements positioned to attach to the caliper.
Figure 3B:
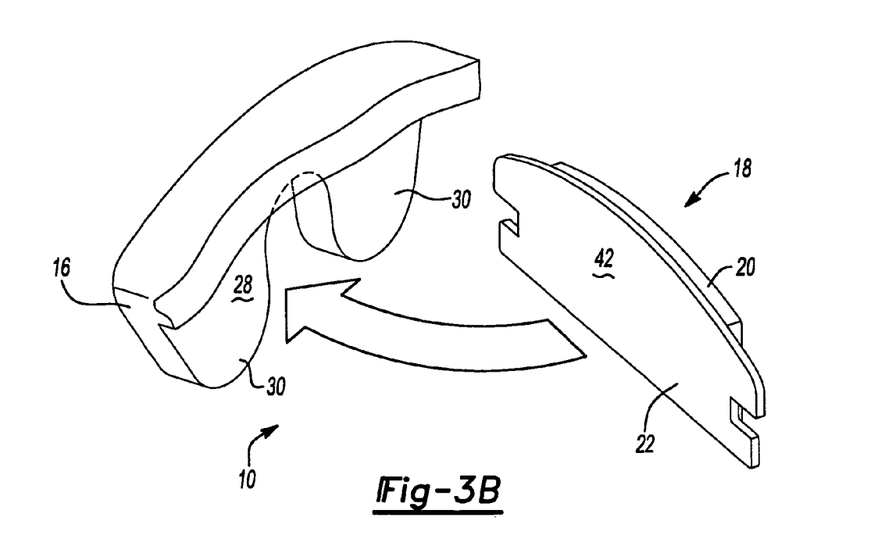
FIG. 3B is similar to FIG. 3A but shows an opposite side of the caliper having a plurality of fingers.
Figure 4:
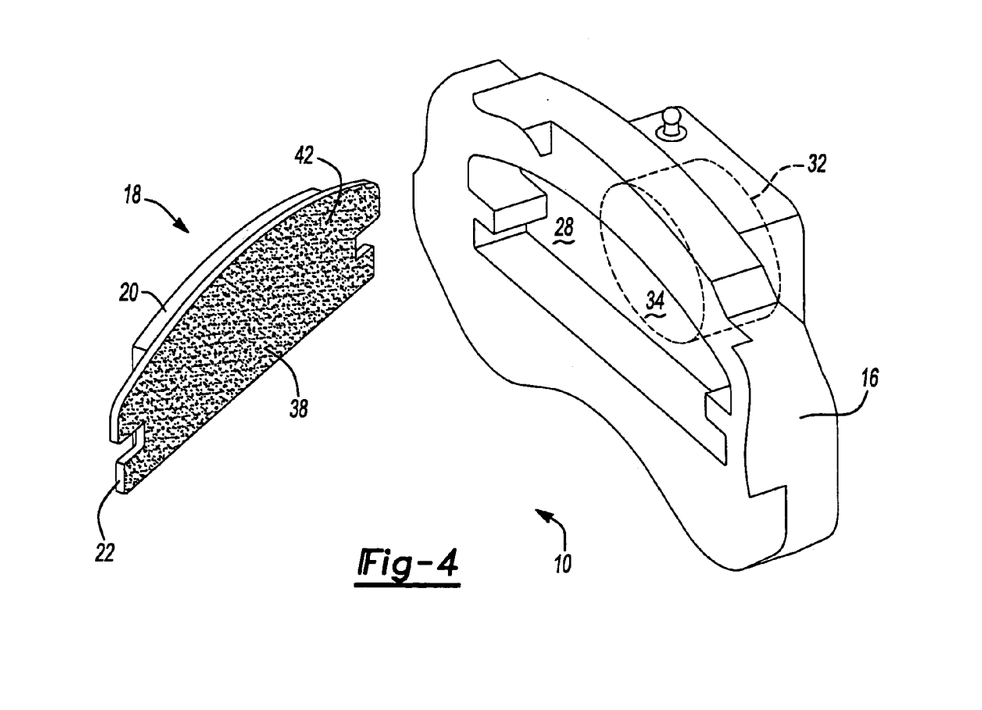
FIG. 4 is a partial perspective view of the caliper of FIG. 3 showing the brake element positioned to attach to the caliper with the adhesive applied to about an entire structural backing of the brake element and configured to adhere the brake element to an interior portion of the caliper.

With reference to FIGS. 3A–9, the brake element 18 is shown positioned for attachment into the caliper 16. In FIG. 3A, the brake element 18 is positioned into the interior portion 28 and abuts the piston 32, while in FIG. 3B the brake element 18 is positioned to abut the plurality of fingers 30. In FIG. 4, the adhesive 38 is shown coated over an entire rear face 42 of the structural backing 22. It will be appreciated that once the brake element 18, as shown in FIGS. 5A and 5B, is placed in the caliper 16, the adhesive 38 will adhere to the interior portion 28 and/or the plurality of fingers 30 (FIG. 5B) of the caliper 16 thus securing the brake element 18 within the caliper 16 until the first service use of the brake system 10. It will be further appreciated that the piston 32 may push the brake element 18 away from the interior portion 28 of the caliper 16 but the brake system 10 is already installed in the vehicle and the need to retain the brake elements 18 in the caliper 16 is no longer present.

Figure 5A:
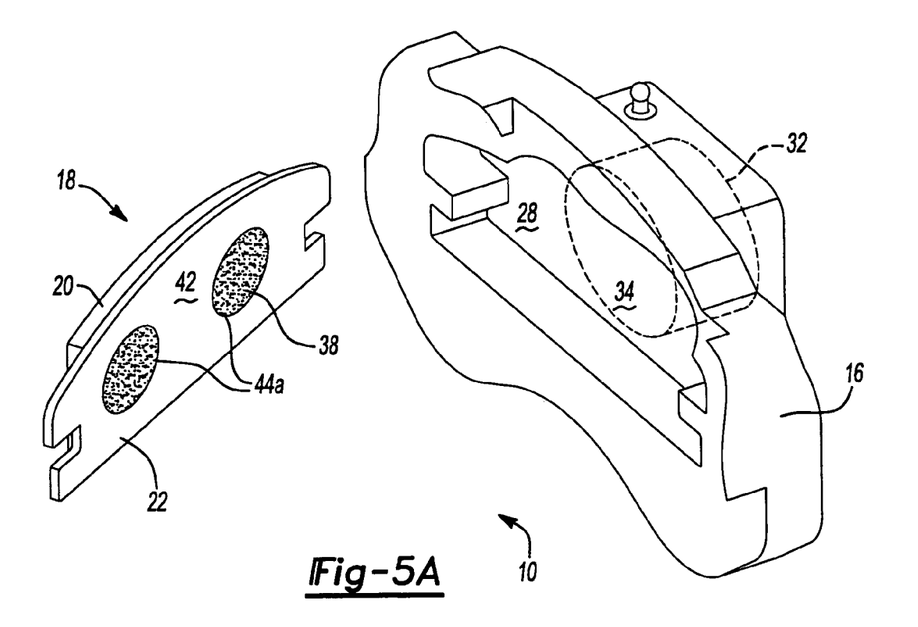
FIG. 5A is a partial perspective view of the caliper of FIG. 3 showing the brake element positioned to attach to the caliper with the adhesive applied as a plurality of circular appliqués to the structural backing and configured to adhere the brake element to an interior portion of the caliper.
Figure 5B:
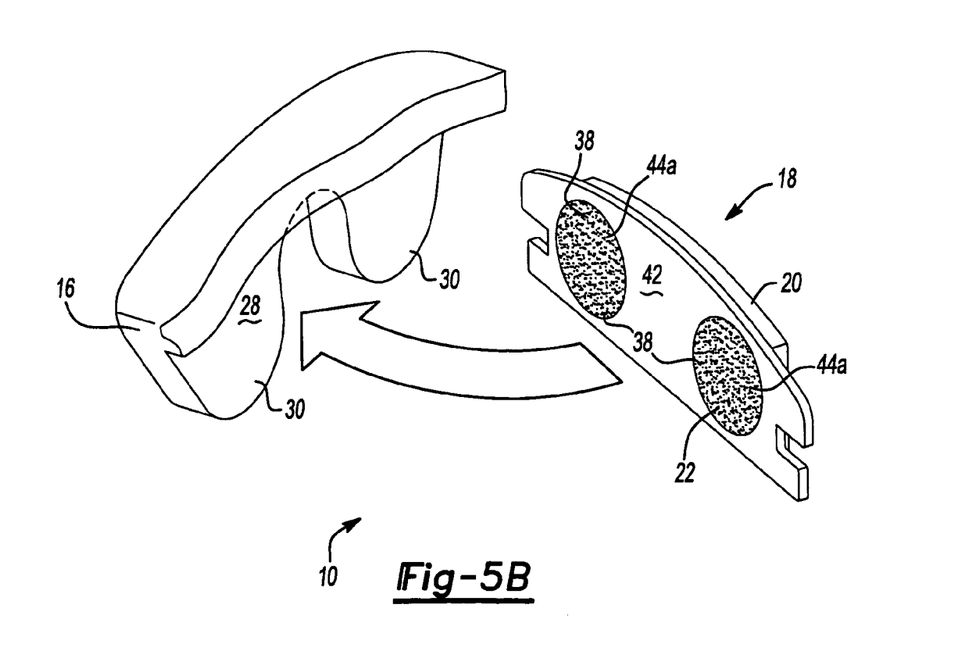
FIG. 5B is a partial perspective view of the caliper of FIG. 3 showing the brake element positioned to attach to the plurality of the fingers within the caliper and the adhesive applied as a plurality of circular appliqués to the structural backing.

With reference to FIGS. 5A and 5B, the adhesive 38 is shown as a plurality of discreet circular discs 44a or circular appliqués 44a applied to the rear face 42 of the structural backing 22 of the brake element 18. It will be appreciated that the brake element 18 when placed in the caliper 16 will adhere to the interior portion 28 of the caliper 16. While the brake element 18 is illustrated with only two circular appliqués 44a, the adhesive 38 can be configured with various appliqués configurations or full coverage configurations and attached to various portions of the brake system 10.

Figure 6A:
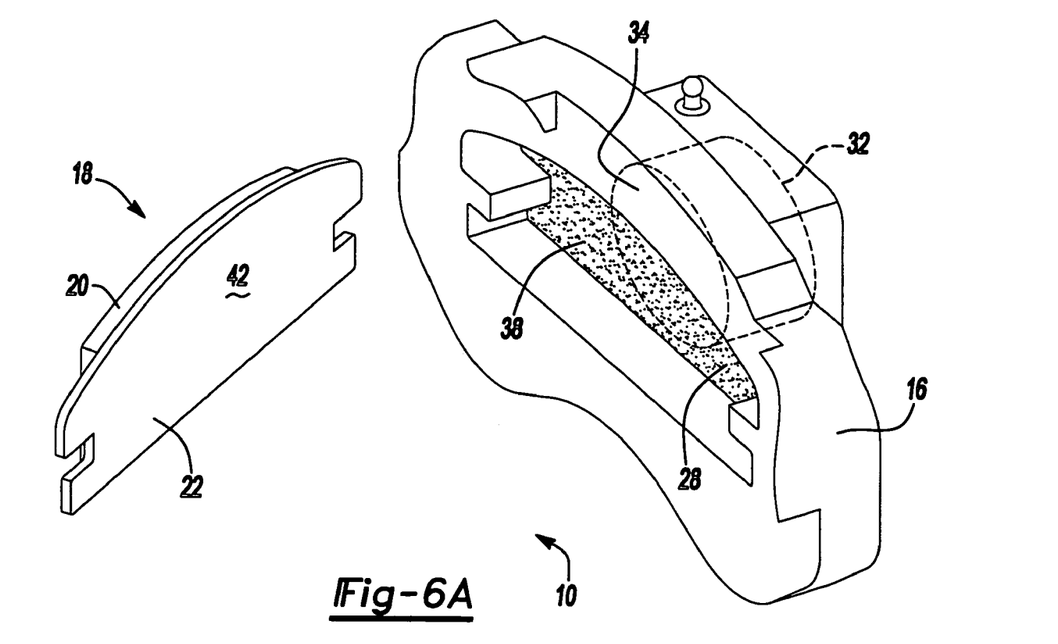
FIG. 6A is a partial perspective view of the caliper of FIG. 3 showing the brake element positioned to attach to the caliper with the adhesive applied to the interior portion of the caliper and configured to adhere the brake element to an interior portion of the caliper.
Figure 6B:
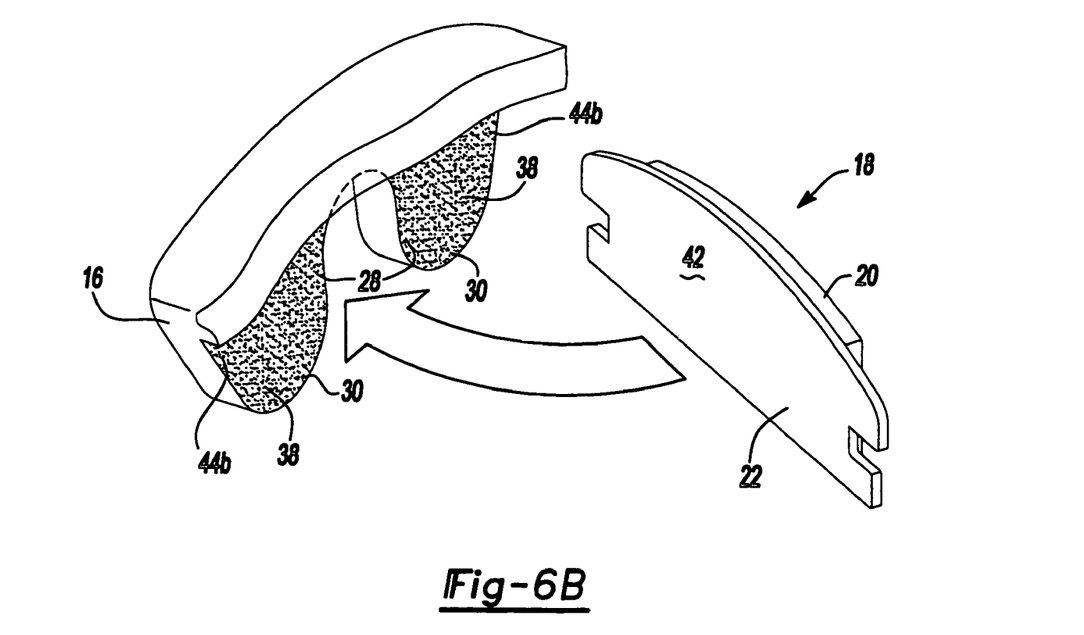
FIG. 6B is a partial perspective view of the caliper of FIG. 3 showing the brake element positioned to attach to the caliper with the adhesive applied to the plurality of fingers.

With reference to FIGS. 6A and 6B, the adhesive 38 is applied to about the entire interior portion 28 of the caliper 16 and the plurality of fingers 30. It will be appreciated that the brake element 18, when placed in the caliper 16 will adhere to the interior portion 28 and/or the fingers 30. It will additionally be appreciated that the adhesive 38 can be or need not be applied to the piston face 34 but only to portions of the caliper 16 where the caliper 16 makes contact with the structural backing 22 of the brake element 18. With reference to FIG. 6B, the adhesive 38 can be applied to about the entire interior portion 28 of the caliper thus coating about the entire plurality of fingers 30. In addition, pre-sized appliqués 44b can be applied to the plurality of fingers 30. The pre-sized appliqués are configured to attach to portions or all of each finger 30.

Figure 7:
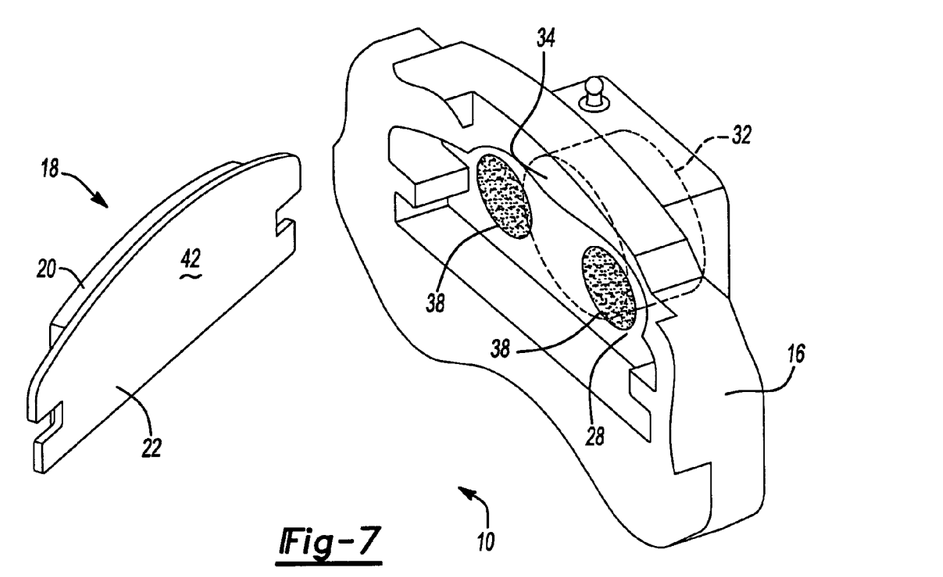
FIG. 7 is a partial perspective view of the caliper of FIG. 3 showing the brake element positioned to attach to the caliper with the adhesive applied as a plurality of circular appliqués to the interior portion of the caliper and configured to adhere the brake element to the interior portion of the caliper.

In FIG. 7, the adhesive 38 are shown attached to the interior portion 28 of the caliper 16 and configured as the two circular appliqués 44a. It will be appreciated that use of the piston 32 may otherwise push the brake element 18 from the interior portion 28 of the caliper 16 thus breaking the bond therebetween, but the caliper 16 is installed in the vehicle and the need to retain the brake elements 18 is no longer present.

Figure 8:
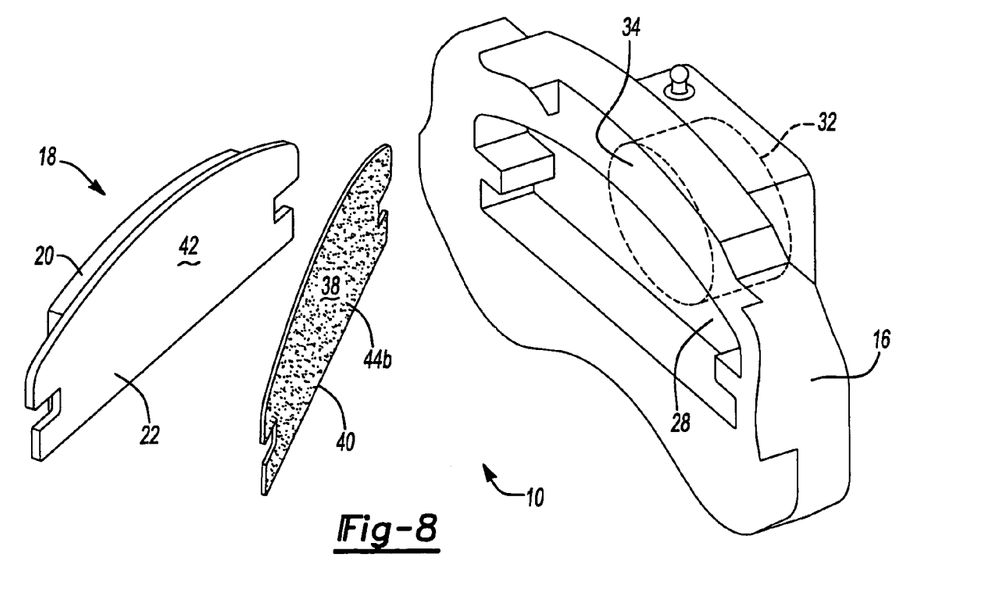
FIG. 8 is a partial perspective view of a brake caliper constructed in accordance with various embodiments of the present invention showing the brake element and the caliper with a shim positioned therebetween, the adhesive is applied to about the entire shim and is configured to adhere the brake element to the interior portion of the caliper.

With reference to FIG. 8, the adhesive 38 is applied to about an entire shim 40, which can be positioned between the brake element 18 and the interior portion 28 of the caliper 16. It will be appreciated that when the brake element 18 and shim 40 are placed in the caliper 16, the brake element 18 will adhere to the interior portion 28 of the caliper 16. It will additionally be appreciated that the adhesive 38 need not be applied to the entire shim 40 but only to portions thereof. Furthermore, the adhesive 38 can be applied to the shim 40 as the pre-sized appliqués 44b.

Figure 9:
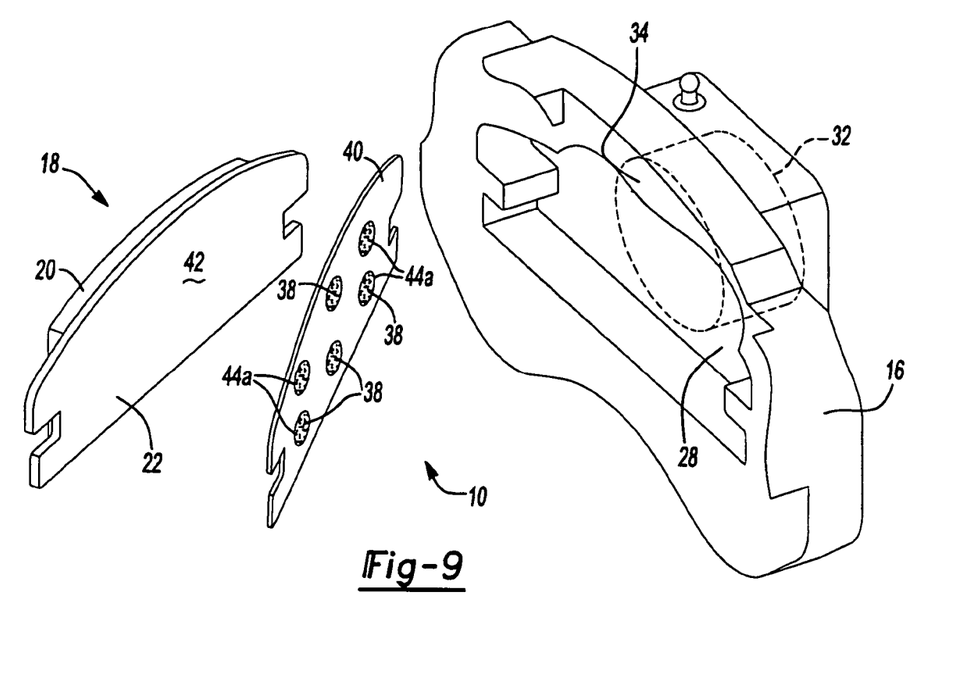
FIG. 9 is a partial perspective view of the caliper of FIG. 8 showing the brake element and the caliper with the shim positioned therebetween, the adhesive is applied as a plurality of circular appliqués to the shim configured to adhere the brake element to an interior portion of the caliper.

In FIG. 9, the adhesive 38 is shown applied to the shim 40 as the plurality of circular appliqués 44a. It will be appreciated that use of the piston 32 may otherwise detach the shim 40 from the interior portion 28 of the caliper 16 but the caliper 16 is installed in the vehicle and the need to retain the brake elements 18 in the caliper 16 is no longer present.

Figure 10:
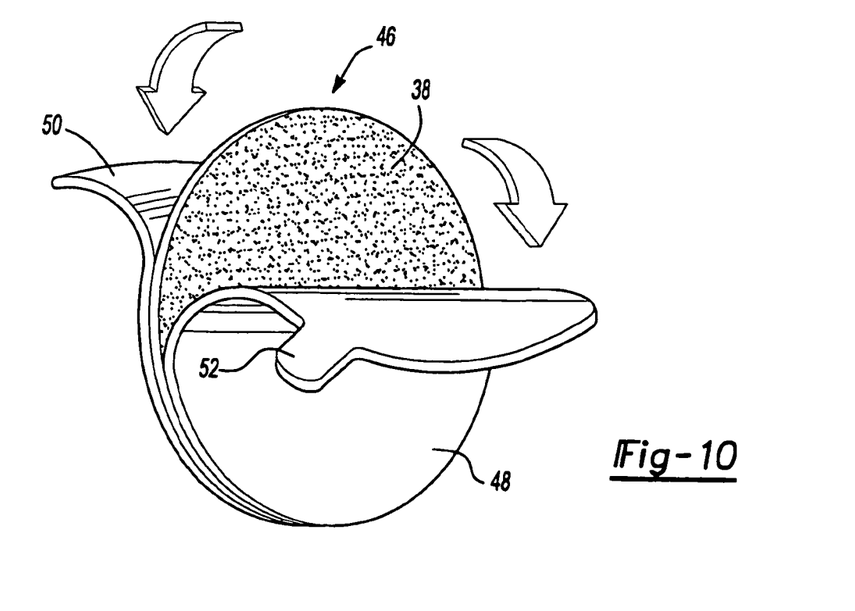
FIG. 10 is a perspective view of a peel-and-stick applicator constructed in accordance with the various embodiments of the present invention.

With reference to FIG. 10, the adhesive 38 is configured as a peel-and-stick applicator 46. The peel-and-stick applicator 46 has a first cover 48 and a second cover 50 that can be removed by the user. The first cover 48 and the second cover 50 can additionally have pull-tabs 52 to aid in removal of the covers 48, 50 on the peel-and-stick applicator 46. After removing the first cover 48 the peel-and-stick applicator 46 can be applied to either the interior portion 28 of the caliper 16, the rear face 42 of the structural backing 22 or the shim 40. After application to the interior portion 28 or the rear face 42 of the structural backing 22, the second cover 50 can be removed from the peel-and-stick applicator 46 and then the brake element 18 can be attached to the interior portion 28 of the caliper 16 thus adhering the brake element 18 to the caliper 16.

It will be appreciated that the shim 40 can be used, such that the applicator 46 can be affixed to the shim 40 as needed. It will further be appreciated that the applicator 46 can be configured with a pressure-sensitive adhesive requiring an initial application of pressure to adhere the components as needed. As with the embodiments illustrated in FIGS. 4–9, the peel-and-stick applicator 46 will cease adhering the brake element 18 or the shim 40 to the caliper 16 after the first service use of the brake system 10.

The adhesive 38 can be applied to an entire surface, as shown in FIGS. 4, 6A and 6B, or can be applied as discrete sections on any surface, as shown in FIGS. 5A, 5B, 7 and 9. Furthermore, the adhesive 38 can be configured as the peel-and-stick application 46, as shown in FIG. 10, and applied to any surface. Regardless of the shape of the adhesive 38 or the application size, the adhesive 38 can be constructed from many different classes of adhesives. Some exemplary classes of adhesives that can used to manufacture the adhesive 38 include, but are not limited to, ethylene-vinyl acetate adhesives, polyolefin adhesives, rubber adhesives, polyurethane adhesives, epoxies, cyanoacrylate adhesives or other suitable adhesives.

A suitable adhesive 38 includes, but is not limited to, the following exemplary characteristics such as retention of the adhesive properties during transport and component handling of the brake system 10. The adhesive 38, however, should lose its adhesive properties after the first service use of the brake system 10. The first service use of the brake system 10 being defined as contact between the friction material 20 and the rotor 12 causing the brake element 18 to heat for the first time to the service temperature. The heating of the caliper 16 to the service temperature causes the adhesive 38 to heat to or in excess of the elevated temperature. About at or above the elevated temperature, the adhesive 38 stops adhering. The elevated temperature is in a range from about 150 degrees Fahrenheit (about 65 degrees Celsius) to about 167 degrees Fahrenheit (about 75 degrees Celsius). It will be appreciated that temperatures in excess of 167 degrees Fahrenheit (75 degrees Celsius) may not cause the adhesive 38 to completely degenerate such that it no longer exists or even completely stop adhering, but the adhesive may just lose some or all of its adhesive properties, such that the brake system functions as if the adhesive were absent.

The adhesive can comprise various suitable polymers such as, but not limited to, an ethylene-vinyl acetate, a polyolefin, a rubber adhesive, a polyurethane adhesive, an epoxy, a cyanoacrylate, a pressure-sensitive adhesives, and copolymers and mixtures thereof. In the various preferred embodiments of the present invention, the adhesive can comprise a cyanoacrylate, an epoxy and copolymers and mixtures thereof. Moreover, various adhesive suppliers provide adhesives that can be used in the present invention. For example, Loctite® 403 Low Odor Instant Adhesive or Loctite® 380 Instant Adhesive are both suitable adhesives and are commercially available through Henkel® Loctite® Corporation of Rocky Hill, Conn. Additional suitable and exemplary adhesives include 3M® Scotch-Weld™ Epoxy Adhesive, specifically model 2216 B/A, commercially available from 3M® Engineered Adhesives of St. Paul, Minn.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A brake system comprising:
    a caliper configured to clamp against a rotor;
    a brake element connected to said caliper; and
    an adhesive providing temporary adhesion of said brake element to said caliper, wherein said adhesive stops adhering said brake element to said caliper after said adhesive heats to an elevated temperature.

2. The brake system of claim 1, wherein said brake element includes a friction material connected to a structural backing, said structural backing having a rear face opposite said friction material.

3. The brake system of claim 2, wherein said adhesive is connected to said rear face of said structural backing.

4. The brake system of claim 3, wherein said adhesive is configured to cover about completely said rear face.

5. The brake system of claim 2, wherein said adhesive is configured as a plurality of discrete appliqués applied to said rear face.

6. The brake system of claim 2, wherein said caliper has an interior portion configured to accept said brake element, and wherein said adhesive is applied to said rear face and said interior portion.

7. The brake system of claim 1, wherein said caliper has an interior portion configured to accept said brake element.

8. The brake system of claim 7, wherein said adhesive is configured as a plurality of appliqués applied to said interior portion of said caliper.

9. The brake system of claim 7, wherein said adhesive is configured to cover about completely said interior portion of said caliper.

10. The brake system of claim 1, further comprising a piston face attached to a piston connected to said caliper and operable to push against said brake element, wherein said adhesive is applied to at least a portion of said piston face.

11. The brake system of claim 1, further comprising a plurality of fingers formed from said caliper, wherein said adhesive is applied to at least a portion of said plurality of fingers.

12. The brake system of claim 1, wherein a first service use of the brake system causes said brake element to heat to a service temperature from an ambient temperature, the heating of said brake system to said service temperature causing said adhesive to heat to said elevated temperature.

13. The brake system of claim 12, wherein said adhesive stops adhering said brake element to said caliper after said first service use.

14. The brake system of claim 1, further comprising a shim positioned between said brake element and said caliper, said adhesive adhering said brake element and said caliper to said shim, wherein said adhesive stops adhering said brake element and said caliper to said shim after said adhesive heats to an elevated temperature.

15. The brake system of claim 14, wherein said adhesive is configured to cover about completely said shim.

16. The brake system of claim 14, wherein said adhesive is configured as a plurality of discrete appliqués applied to said shim.

17. The brake system of claim 14, wherein a first service use of the brake system causes said brake element to heat to a service temperature from an ambient temperature, the heating of said brake system to said service temperature causing said adhesive to heat to said elevated temperature, and wherein said adhesive stops adhering said brake element and said caliper to said shim after said first service use.

18. The brake system of claim 1, wherein said elevated temperature is in a range from about 150 degrees Fahrenheit (about 65 degrees Celsius) to about 167 degrees Fahrenheit (about 75 degrees Celsius).

19. The brake system of claim 1, wherein said service temperature is in a range from about 140 degrees Fahrenheit (about 60 degrees Celsius) to about 1800 degrees Fahrenheit (1000 degrees Celsius).

20. The brake system of claim 1, wherein said service temperature is in a range from about 140 degrees Fahrenheit (about 60 degrees Celsius) to about 220 degrees Fahrenheit (about 105 degrees Celsius).

21. The brake system of claim 1, wherein said adhesive comprises a cyanoacrylate.

22. The brake system of claim 1, wherein said adhesive comprises an epoxy.

23. The brake system of claim 1, wherein said adhesive comprises a polymer selected from a group consisting of ethylene-vinyl acetate, polyolefin, rubber adhesives, polyurethane adhesives, epoxies, cyanoacrylates, pressure-sensitive adhesives, and copolymers and mixtures thereof.

24. The brake system of claim 1, wherein said adhesive is configured as a peel and stick applicator.

25. A brake system having a brake element configured to connect to a caliper, the brake system comprising:
    an adhesive configured to temporary connect the brake element to the caliper until said adhesive reaches a temperature in a range from about 150 degrees Fahrenheit (about 65 degrees Celsius) to about 167 degrees Fahrenheit (about 75 degrees Celsius) wherein said adhesive stops adhering said brake element to said caliper.

26. A method of connecting a brake element to a brake caliper comprising:
    providing the brake caliper;
    providing the brake element configured to connect to the brake caliper;
    applying an adhesive to one of the brake caliper and the brake element;
    adhering temporarily the brake element to the brake caliper;
    heating the brake element to a service temperature and the adhesive to an elevated temperature; and
    reducing adhesion of the brake element from the brake caliper when the brake elements exceeds said elevated temperature.

27. The method of claim 26, wherein said elevated temperature is in a range from about 150 degrees Fahrenheit (about 65 degrees Celsius) to about 167 degrees Fahrenheit (about 75 degrees Celsius).

28. The method of claim 26, further comprising reducing adhesion of the brake element from the brake caliper when the brake elements heat to a service temperature.

29. The method of claim 28, wherein said service temperature is in a range from about 140 degrees Fahrenheit (about 60 degrees Celsius) to about 220 degrees Fahrenheit (about 105 degrees Celsius).

30. The method of claim 26 further comprising providing a shim positioned between the brake element and the brake caliper.

31. The method of claim 26, wherein said adhesive comprises a polymer selected from a group consisting of ethylene-vinyl acetate, polyolefin, rubber adhesives, polyurethane adhesives, epoxies, cyanoacrylates, pressure-sensitive adhesives, and copolymers and mixtures thereof.

* * * * *